Sept. 30, 1969 R. L. RISBERG 3,470,449
CONSTANT FREQUENCY INVERTER WITH FREQUENCY OVERRIDE
Filed April 8, 1968 2 Sheets-Sheet 2

Inventor
Robert L. Risberg
By [signature]
Attorney

# United States Patent Office 3,470,449
Patented Sept. 30, 1969

3,470,449
CONSTANT FREQUENCY INVERTER WITH
FREQUENCY OVERRIDE
Robert L. Risberg, Milwaukee, Wis., assignor to Cutler-
Hammer, Inc., Milwaukee, Wis., a corporation of
Delaware
Filed Apr. 8, 1968, Ser. No. 719,383
Int. Cl. H02m 1/18
U.S. Cl. 321—11                                    10 Claims

ABSTRACT OF THE DISCLOSURE

A single-phase solid state inverter supplied from a D.C. source and controlled by a unijunction oscillator to provide a constant 60 c.p.s. frequency, constant amplitude A.C. output independent of supply voltage variations within a reasonable range. An RC timing circuit at the oscillator input provides higher frequency at start-up to avoid high inrush current to the output transformer and to allow use of lower rating components in the commutating circuits. A frequency override circuit at the oscillator input operates if the supply voltage should increase beyond the aforesaid range—above 120 percent of nominal voltage—to prevent saturation of the output transformer.

Background of the invention

In many industrial applications where only direct current power is conveniently available, alternating current power is also desired for various types of auxiliary apparatus. This requires an inverter for converting the D.C. to A.C.

For example, in heavy industrial moving machines such as cranes and the like that are powered by direct current, alternating current is desired for powering auxiliary devices such as radio, proximity limit switches, weighing systems and the like. However, due to the movable nature of the machine, it is not practical to connect A.C. power to it in addition to the D.C. power that it already has for motive purposes. Accordingly, a practical solution to the problem is to convert some of the D.C. to A.C. This is most desirably done by static means such as a solid state inverter rather than by rotating generator equipment.

In certain applications where a 250-volt D.C. source is available for supplying the inverter, it must be capable of providing 1 kva. output A.C. power having a constant frequency and amplitude.

While solid state inverters of various types and power ratings are known in the art, the invention involves certain improvements therein for the above purposes.

Solid state inverters of various types and power ratings including the half-bridge silicon controlled rectifier type are known in the art. My Patent No. 3,355,654, dated November 28, 1967, discloses a three-phase SCR inverter having three controllable half-bridges connected in parallel across the D.C. source.

This invention relates to improvements in inverters generally of the type disclosed in the aforementioned patent hereinafter described and illustrated in connection with a single-phase inverter having one controllable half-bridge connected across a D.C. source.

Summary of the invention

An object of the invention is to provide an improved static inverter.

A more specific object of the invention is to provide a solid state inverter of the controlled half-bridge type with improved means providing higher frequency at start-up.

Another specific object of the invention is to provide an improved static inverter with means for maintaining its output frequency and amplitude constant independent of input supply voltage variations over a reasonable range and for increasing its frequency in proportion to voltage when the supply voltage exceeds a predetermined value above nominal voltage.

Another object of the invention is to provide a solid state inverter that is simple in construction and efficient in operation.

Other objects and advantages of the invention will hereinafter appear.

Description of the preferred embodiment

Figure 1:
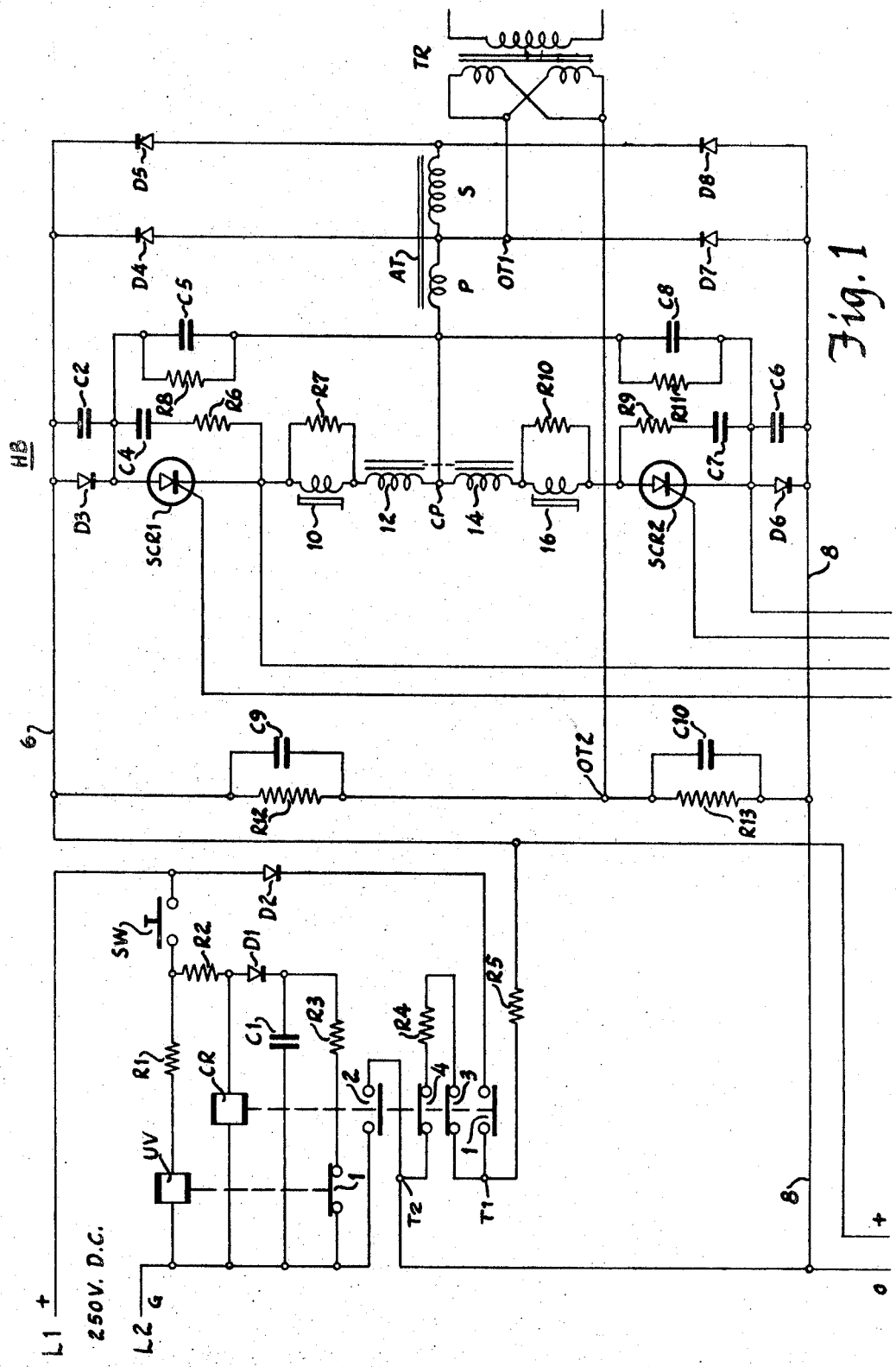
FIGURE 1 is a circuit diagram showing a solid state inverter and its supply voltage circuit constructed in accordance with the invention.
Figure 2:
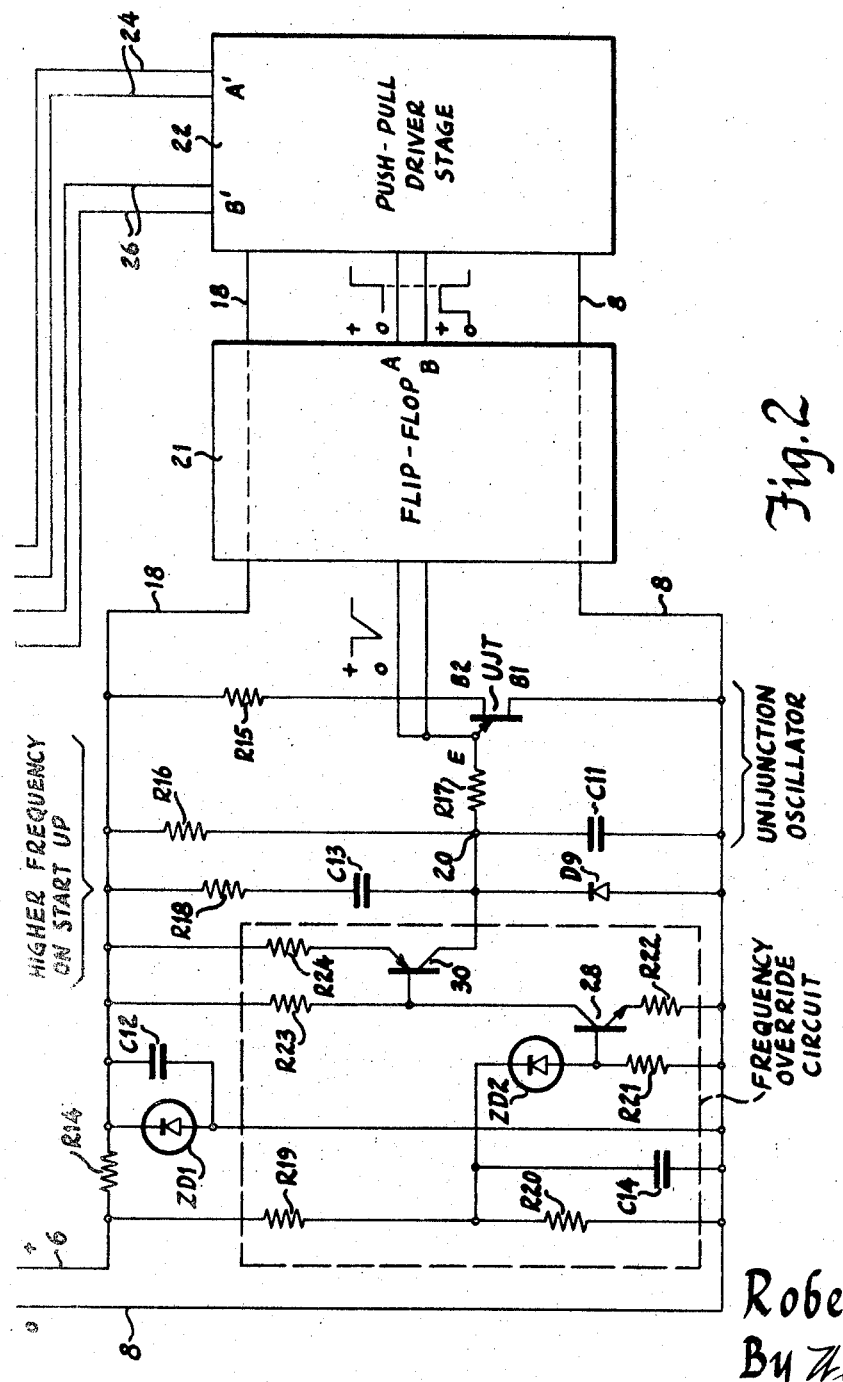
FIG. 2 is a circuit diagram showing means for controlling the inverter of FIG. 1 when connected at its top to the bottom of the circuit in FIG. 1.

Referring to FIGS. 1 and 2, when arranged so that the conductors at the bottom of FIG. 1 connect with the conductors at the top of FIG. 2, there is shown a single-phase inverter system having a D.C. input at the upper left-hand portion and an A.C. output at the upper right-hand portion. This system consists of generally a power supply switching control circuit at the left-hand portion of FIG. 1, an inverter circuit at the right-hand portion of FIG. 1, an oscillator and frequency control circuits therefor at the left-hand portion of FIG. 2, and a flip-flop circuit and a push-pull driver stage circuit at the right-hand portion of FIG. 2.

The power supply switching control circuit in the left-hand portion of FIG. 1 comprises means providing a time delay between disconnection and reconnection of power to allow the inverter capacitors to discharge. This means comprises a manual switch SW controlling an undervoltage relay UV circuit which controls a time delay control relay CR. Switch SW is an on-off switch of the type which when turned on or closed will remain closed and must be manually turned off or opened. This switch is connected in series with a current limiting resistor R1 and the coil of undervoltage relay UV in that order from positive power supply line L1 to grounded or neutral power supply line L2, lines L1 and L2 being adapted to be connected through suitable fuses or the like to a D.C. source of 250 volts. The junction between switch SW and resistor R1 is connected through a current limiting resistor R2 and the coil of control relay CR in series in that order to line L2. The junction between resistor R2 and coil CR is connected through an isolating diode D1 in its forward low impedance direction and a timing capacitor C1 in series in that order to line L2. The junction between diode D1 and capacitor C1 is connected through a discharge resistor R3 and normally closed contact 1 of relay UV in series to line L2. Line L1 is connected through a reverse blocking diode D2 and a normally-open contact 1 of relay CR in series to a positive voltage supply terminal T1 of the inverter. Line L2 is connected through a normally-open contact 2 of relay CR to a neutral voltage or common supply terminal T2 of the inverter. Terminal T1 is connected through an inverter discharge circuit to terminal T2, this circuit comprising a normally-closed contact 3 of relay CR, a resistor R4 and a normally-closed contact 4 of relay CR in series connection.

The inverter shown in the right-hand portion of FIG. 1 is provided with positive and common power supply voltage conductors 6 and 8. Conductor 6 is supplied with positive voltage from terminal T1 through a small series resistor R5 while conductor 8 is connected directly to terminal T2.

As shown in FIG. 1, the inverter comprises a half-bridge HB connected from conductor 6 to conductor 8. This half-bridge includes two parts, a positive part between conductor 6 and a common or center point CP and a negative part between the common point and conductor 8.

The positive part comprises a diode D3 connected in its forward low impedance direction from conductor 6 through the anode and cathode of a semiconductor controlled rectifier SCR1, a protecting inductor 10 and a commutating inductor 12 to center point CP. A transient suppression capacitor C2 is connected across diode D3. A capacitor C4 and a resistor R6 are connected in series across SCR1 to slow down the rate of change of voltage across the SCR and to absorb recovery transients. A by-pass current resistor R7 is connected across inductor 10. A bleeder resistor R8 and a commutating capacitor C5 are connected in parallel between the anode of SCR1 and center point CP, that is, across SCR1 and inductors 10 and 12. Center point CP is connected through the first part of the winding (primary) of a 1 to 10 turn ratio auto transformer AT and its tap to output terminal OT1. This tap is connected through a feedback diode D4 in its forward low impedance direction to positive voltage conductor 6. This tap is connected through the second part of the winding (secondary) of the auto transformer and a feedback diode D5 in its forward low impedance direction to positive voltage conductor 6.

The negative part of the half-bridge is similar to the positive part thereof just described except that the series components are in reverse order with respect to the supply voltage polarity. That is, center point CP, which may be a center tap on a single commutating inductor, is connected through commutating inductor 14, protecting inductor 16, SCR2 and diode D6 to common conductor 8. A transient suppression capacitor C6 is connected across diode D6. A capacitor C7 and a resistor R9 are connected in series across SCR2 for the same purpose as capacitor C4 and resistor R6. A by-pass current resistor R10 is connected across inductor 16. A bleeder resistor R11 and a commutating capacitor C8 are connected in parallel between the cathode of SCR2 and center point CP, that is, across SCR2 and inductors 14 and 16. Common conductor 8 is connected through a feedback diode D7 in its forward low impedance direction to output terminal OT1 and the tap between the primary and secondary of the auto transformer. Common conductor 8 is also connected through a feedback diode D8 in its forward low impedance direction to the other end of the auto transformer secondary winding.

Inductors 10 and 16 in the inverter are ferrite core inductors for rate of change of current ($di/dt$) protection of the associated SCR's. These inductors are saturating reactors provided with individual cores of square hysteresis loop material and provide their protective functions when the respectively associated SCR's are fired. Without these reactors, the current would jump to the value flowing in the other part of the half-bridge and its rate of change would be limited only by the leakage reactance of the commutating inductance coil. The ferrite inductor allows only a small current to flow, equal to the coercive ampere turns, until the core saturates, thus allowing the SCR to turn fully on before the current increases to the load current level. The ferrite core is reset by a displacement current that flows backwards through the SCR being turned off.

By-pass resistors R7 and R10 are provided in shunt of inductors 10 and 16, respectively, to allow in each case a larger reverse current to flow in the associated SCR to turn it off. When one SCR is turned on and the commutating inductor applies reverse voltage on the other SCR, the ferrite core inductor allows only about one ampere of reverse current to flow in the associated SCR. To increase this reverse current to about 4 to 5 amperes to insure turn-off of the SCR, a resistor such as R7 is placed across the ferrite core inductor to by-pass reverse current.

Since the center point CP of the half-bridge is coupled to one output terminal and switches from near 250 volts when SCR1 is conducting to near zero volts or ground potential when SCR2 is conducting, an intermediate voltage point must be provided for the other output terminal at which it is held while such center point voltage alternates positive and negative relative thereto in order to provide an A.C. output. For this purpose, a center-tapped capacitor or a pair of capacitors C9 and C10 are connected in series between conductors 6 and 8 and the other output terminal OT2 is placed therebetween. Bleeder resistors R12 and R13 are connected across capacitors C9 and C10, respectively.

An output transformer TR is provided with two primary windings and a secondary winding. The primary windings are connected in parallel to output terminals OT1 and OT2 of the inverter and the secondary winding is adapted to supply A.C. power to a load device. This transformer provides a constant amplitude output although the input amplitude to it might vary plus or minus 20 percent.

The D.C. power supplied to the inverter is also supplied to the control circuits in FIG. 2. For this purpose, positive and negative voltage conductors 6 and 8 in FIG. 1 extend to FIG. 2. Conductor 6 in FIG. 2 is connected through voltage dropping resistor R14 to a positive control voltage conductor 18.

The control circuits in FIG. 2 comprise a pulse generator such as a relaxation oscillator for developing voltage pulses at a normal frequency of 120 pulses per second, a flip-flop circuit controlled by these voltage pulses to provide output signals alternately at its two output terminals, a pushpull driver stage controlled by the flip-flop circuit to provide firing signals alternately to the gates of SCR1 and SCR2 of the inverter, a resistance-capacitance (RC) for operating the oscillator at a higher frequency at start-up, and a frequency override circuit which increases the oscillator frequency in the event the supply voltage goes abnormally high and exceeds a predetermined value up to which the frequency is maintained constant.

This relaxation oscillator comprises a unijunction transistor UJT and a basic-frequency control circuit therefor. The unijunction transistor receives supply voltage from positive voltage conductor 18 through a resistor R15 to its base B2 while its base B1 is connected directly to common conductor 8. The basic-frequency control circuit comprises a resistor R16 and a capacitor C11 connected in series in that order from positive voltage conductor 18 to common conductor 8 with a junction 20 therebetween. This junction is connected through a resistor R17 to the emitter E of the unijunction transistor. The purpose of resistor R17 is to provide the pulses with a steep negative-going wave front.

The supply voltage on conductor 18 is brought to the proper value by dropping resistor R14 and is regulated by Zener diode ZD1 and noise suppression capacitor C12 connected in parallel between conductors 18 and 8.

Flip-flop circuit 20 is preferably a base triggering N-P-N transistor type wherein a negative-going pulse at the two input terminals turn the "on" or conducting transistor off. As shown in FIG. 2, the emitter of unijunction transistor UJT is connected directly to both input terminals of the flip-flop circuit. Since flip-flop circuits of this type are well known and shown in reference books, the details thereof have not been shown to avoid complicating the drawings.

Push-pull driver stage 22 is preferably of the transistor type and is designed to supply the input signal power required by the SCR's in the inverter. This driver stage may include a pair of single-stage transistor amplifiers or the like connected in a switching mode and alternately operated by positive-going pulses from outputs A and B of flip-flop 20. For example, each such amplifier stage might include a voltage divider input to the base of a first N-P-N transistor driving a second N-P-N transistor connected in Darlington configuration with the collectors of both transistors being center-tap-transformer coupled to the pairs of conductors A' and B' whereby firing pulses are applied to the SCR's in the inverter. When transistor A of the flip-flop is turned off, output A goes positive to turn on one of the driver stage amplifiers to provide a firing signal from output terminal A' through conductor pair 24 to fire SCR2. Alternatively, when transistor B of the flip-flop is turned off, output B goes positive as shown in FIG. 2 to turn on the other amplifier in the driver stage to provide a firing signal from output terminal B' through conductor pair 26 to fire SCR1. The two transistors of the flip-flop circuit are turned off alternately by successive pulses from the oscillator and when one of these transistors turns off, the other one turns on automatically under the control of the flip-flop circuit.

The higher frequency on start-up circuit comprises a circuit from positive voltage conductor 18 through a resistor R18 and a capacitor C13 in series to junction 20. A diode D9 is connected in its forward low impedance direction from conductor 8 to junction 20 to provide a discharge path for capacitor C13 which becomes effective to speed up its discharge when power is disconnected. This circuit supplies supplementary current to capacitor C11 to increase the frequency of the oscillator for about one second at start-up. To provide the basic frequency, current flows through resistor R16 to charge capacitor C11. Each time capacitor C11 is charged to the peak emitter voltage of the unijunction transistor, the latter conducts and discharges capacitor C11 through resistor R17 and the emitter-base B1 circuit of the unijunction transistor. Capacitor C11 then recharges and discharges repeatedly to supply pulses to the flip-flop circuit as indicated in FIG. 2. The time that it takes capacitor C11 to charge to the peak emitter voltage determines the frequency of the oscillator and this time depends on the value of resistor R16. It will therefore be apparent that the higher the charging current, the higher the frequency. Consequently, additional current flowing through resistor R18 and capacitor C13 to capacitor C11 increases the frequency at start up. This start up frequency then decreases exponentially to the basic value as capacitor C13 charges and cuts off current flow therethrough.

The frequency override circuit in the left-hand portion of FIG. 2 comprises a spillover circuit that becomes effective when the supply voltage exceeds a predetermined value thereby to increase the frequency and prevent saturation of the output transformer. It will be apparent that if the supply voltage magnitude should increase very much, more volt-seconds per half-cycle will be put into the output transformer and its core will have a tendency to saturate. However, if the frequency is increased with constant magnitude, less volt-seconds per half-cycle are put into the output transformer. It can therefore be seen that by increasing the frequency in proportion to increase in voltage magnitude above a predetermined value, the output transformer can be kept below saturation in the operating range.

This spillover circuit comprises a voltage divider including two series resistors R19 and R20 connected between conductors 6 and 8 with the junction between these resistors being connected through a Zener diode ZD2 and a resistor R21 in series to common conductor 8. A capacitor C14 is connected across Zener diode ZD2 and resistor R21 to absorb any voltage transients and thereby prevent inadvertent breakover of the Zener diode. The junction between Zener diode ZD2 and resistor R21 is connected to the base of an N-P-N transistor 28. The emitter of this transistor is connected through a resistor R22 to common conductor 8 and the collector thereof is connected through a resistor R23 to positive voltage conductor 18. The collector of transistor 28 is connected directly to the base of a P-N-P transistor 30 which has its emitter connected through a resistor R24 to conductor 18 and has its collector connected to junction 20 to pass charging current therethrough to capacitor C11 of the oscillator. This circuit comprising transistors 28 and 30 is a two-stage direct coupled amplified which responds to spillover of Zener diode ZD2 to supply current to capacitor C11 thereby to render the oscillator frequency directly proportional to the amount by which the supply voltage magnitude exceeds 120 percent of nominal voltage.

The operation of the system of FIGS. 1 and 2 will now be described.

Assuming that D.C. power is connected to lines L1 and and L2, closure of switch SW causes energization of the coil of undervoltage relay UV in a circuit extending through this switch and resistor R1. Relay UV opens at its contact 1 the resistor R3 shunt across timing capacitor C1. As a result, this capacitor now charges by current flow from line L1 through switch SW, resistor R2 and diode D1. The time constant of resistor R2 and capacitor C1 determines the time delay for operation of relay CR and when this capacitor has charged to a predetermined voltage level, the operating coil of relay CR energizes. As a result, relay CR closes its contacts 1 and 2 to connect supply lines L1 and L2 to conductors 6 and 8, respectively.

Line L1 is connected to conductor 6 through unidirectional diode D2, contact 1 of relay CR, input terminal T1 and series resistor R5. This diode D2 is provided to protect the inverter in the event lines L1 and L2 should be inadvertently connected to the D.C. supply in reverse order. Resistor R5 provides an RC time constant in conjunction with the inverter capacitors, particularly the large capacitors C9 and C10, to limit the current when power is connected to the inverter and also when voltage transients occur in the D.C. supply.

Line L2 is connected to conductor 8 through contact 2 of relay CR and input terminal T2.

Relay CR also opens its contacts 3 and 4 to interrupt a resistance shunt circuit across input terminals T1 and T2 of the inverter. This shunt circuit that includes resistor R4 is automatically connected across the inverter input whenever power fails or is disconnected. The purpose of this resistance shunt is to provide a discharge path for the inverter capacitors quickly to discharge the high voltages therefrom.

The aforementioned connection of the D.C. supply to conductors 6 and 8 causes current to flow from conductor 6 in FIG. 1 through capacitor C9 and resistor R12 in parallel, through output terminal OT2 and then through capacitor C10 and resistor R13 in parallel to conductor 8. These resistors and capacitors have equal values, respectively, and this circuits acts effectively as a voltage divider to maintain the voltage at output terminals OT2 constant at one-half the value of the supply voltage or at 125 volts D.C. for a supply voltage of 250 volts D.C.

The supply voltage also causes current to flow from conductor 6 in FIG. 1 through unidirectional diode D3, commutating capacitors C5 and C8 and unidirectional diode D6 to conductor 8 to charge these capacitors each to one-half the supply voltage. However, the charge on these capacitors will be increased before they perform their function as hereinafter described. The supply voltage also causes current to flow from conductor 6 in FIG. 2 through resistors R19 and R20 to conductor 8. These resistors form a voltage divider to provide at the junction therebetween a predetermined voltage level as an input voltage for the frequency override circuit. That is, this voltage level is set so that Zener diode ZD2 normally blocks current at normal supply voltage and up to 120 percent supply voltage magnitude. This would be 300 volts on a 250 volt supply. Zener diode ZD2 breaks over and passes current whenever the supply voltage rises above 300 volts D.C. as hereinafter more fully described.

The supply voltage also causes current to flow through resistor R14 and Zener diode ZD1 to conductor 8. Resistor R14 drops the voltage from 250 volts D.C. to provide the proper low voltage on conductor 18 as a supply voltage for the transistors and the remainder of the control circuit. Zener diode ZD1 maintains the voltage between conductors 18 and 8 substantially constant and capacitor C12 absorbs voltage peaks due to electrical noise in the supply.

The supply voltage on conductor 18 causes current to flow through resistor R16 to charge capacitor C11 of the relaxation oscillator. The other currents charging capacitor C11 will be disregarded for the time being. When the voltage on this capacitor reaches the peak emitter value of unijunction transistor UJT, the latter is rendered conducting and discharges the capacitor through resistor R17 and the emitter-base B1 circuit. This causes a steep wave front negative-going (from positive voltage to zero) pulse to be applied from the emitter to both of the two inputs of the flip-flop.

The supply voltage on conductor 18 also causes one of the transistors in flip-flop 20 to conduct as is well known in the art. This causes a ground or zero voltage at output A as shown in FIG. 2. Moreover, the well known cross-coupling in the flip-flop causes the other transistor to be biased off to provide a positive voltage at output B as shown in FIG. 2.

The transistors in the flip-flop are provided with the well known capacitor-diode-resistor steering circuits or "gates" so that only the conducting transistor will be affected by the input pulse. The negative-going input pulse turns the conducting transistor off which causes the other transistor to be turned on thereby to provide a positive voltage output signal at terminal A and to terminate the output signal at terminal B. The capacitor in the oscillator then recharges and discharges repeatedly to provide a series of pulses to the flip-flop whereby positive voltage output signals are alternatively produced at output terminals A and B thereof.

These output signals from the flip-flop circuit operate the driver stage amplifiers to cause firing signals to be applied alternately from terminals A' and B' through conductor pairs 24 and 26 to the gate-emitter circuits of SCR1 and SCR2 thereby to operate the inverter to provide a square-wave A.C. output. For this operation of the inverter in FIG. 1, let it be assumed that SCR1 is fired into conduction first. This causes current to flow from conductor 6 through diode D3, SCR1, inductors 10 and 12, center point CP, primary winding P of transformer AT, output treminal OT1, the primary windings of output transformer TR in parallel, output terminal OT2, and capacitor C10 to conductor 8. This current flow may be assumed to provide the positive half-cycle of output voltage at the secondary winding of output transformer TR.

This current flow prepares commutating conditions for SCR1. For this purpose, the current flowing through SCR1 charges capacitor C8 to substantially 250 volts and diode D6 traps this voltage on the capacitor and prevents discharge thereof into the supply lines.

Now, when SCR2 is fired into conduction, capacitor C8 commutates SCR1 off. When SCR2 is rendered conducting, capacitor C8 discharges through inductors 14 and 16 and SCR2. The current flowing in inductor 14 induces a voltage in inductor 12 due to the common core coupling therebetween and this voltage reverse biases SCR1 to turn it off.

When SCR1 is turned off, current now flows from conductor 6 through capacitor C9, output terminal OT2, the two primary windings of output transformer TR in parallel, output terminal OT1, primary winding P of feedback auto transformer AT, center point CP, inductors 14 and 16, SCR2 and diode D6 to conductor 8. This current flow is in the opposite direction in the primary windings of the output transformer and provides the negative half-cycle of output voltage. With SCR1 turned off, commutating capacitor C5 charges to substantially the supply voltage and this charge is trapped on the capacitor by blocking diode D3 so that it will be available to turn SCR2 off when SCR1 is next fired.

Feedback auto transformer AT serves a double purpose in the invrter circuit. First, it serves to feed back energy from the commutating inductors through feedback diodes D4, D5, D7 and D8 into the D.C. conductors and therethrough into the inverter capacitors. Secondly, it prevents saturation of the output transformer by putting in a bucking voltage to reduce the voltage at the output transformer from 125 to 100 volts thereby allowing use of a conventional 110 volt transformer as the output transformer instead of a special voltage transformer on a system supplied from a 250 volt D.C. source.

For the first purpose mentioned above, auto transformer AT is provided with a primary-secondary winding turn ratio of 1 to 10. Thus, for 25 volts on the primary, 250 volts is induced in the secondary. When an SCR is fired and the commutating capacitor discharges through one of the commutating inductors 12 or 14, the voltage induced in the latter serves as an energy source to cause current to flow through the auto transformer and the feedback diodes back into the supply conductors.

For the second purpose mentioned above, the output transformer is connected to the inverter through primary winding P of the auto transformer. This primary P reduces the 125 volts at center point CP to 100 volts at the output transformer to allow use of a standard transformer and avoid saturation thereof.

The higher frequency at start-up will now be described. Referring back to the operation of the relaxation oscillator, it will be recalled that the charging of capacitor C11 was said to be caused by current flow through resistor R16. It will be apparent that the charging time determines the frequency of the oscillator output pulses since the faster the capacitor is charged, the higher the pulse frequency will be. The supply voltage on conductor 18 also causes current flow through resistor R18 and capacitor C13 to capacitor C11 initially when power is first applied to the system. This current flows at a decreasing rate and decays to zero as capacitor C13 charges to full voltage value. As will be apparent, this additional current flow increases the frequency of the oscillator initially to several times its normal value of 60 cycles per second from which it decays exponentially with the RC time constant of resistor R18 and capacitor C13 of about one second. This higher frequency at start-up avoids high inrush current to the output transformer and permits a smaller commutating current to be used. Diode D9 completes a discharge path for capacitor C13 through any of the other elements of the circuit to speed up its discharge when power is lost or disconnected so that this capacitor will always start charging from the same level and provide the period of higher frequency at start-up.

The frequency override operation will now be described. It will be recalled that the voltage on divider R19–R20 is set so that spillover Zener diode ZD2 will not operate until the line voltage exceeds 120 percent of nominal voltage. On crane trolley applications and the like where collector rails are used to bring in the supply power, large variations in voltage magnitude commonly occur. For example, the supply voltage might frequently rise 100 volts to 350 volts or 140 percent of nominal voltage. The voltage on conductors 18 and 8 which supply the oscillator is regulated so that the inverter frequency is maintained constant at 60 cycles per second for a reasonable range of supply voltage increase. This reasonable range may be up to 300 volts or 120 percent of nominal supply voltage since the output transformer can handle this variation. Any further increase in supply voltage might saturate the output transformer TR which should be prevented if a controlled uniform output voltage wave is to be maintained. By increasing the frequency proportional to supply voltage above such reasonable range, transformer saturation can be prevented.

If the supply voltage should rise above 300 volts, additional current will be supplied to the relaxation oscillator to increase its frequency. For this purpose, as the supply voltage rises above 120 percent nominal voltage, the voltage on divider R19–R20 exceeds the breakover voltage of Zener diode ZD2. As a result, current flows through the Zener diode and resistor R21 to conductor 8. This current turns transistor 28 on an amount proportional to the amount by which the supply voltage exceeds 300 volts. Current then flows through resistor R23, transistor 28 and resistor R22 to conductor 8. The amplified voltage drop across resistor R23 is applied to the base of transistor 30 to turn the latter on in proportion thereto. As a result, current flows from conductor 18 through resistor R24 and transistor 30 to common point 20. This current is added to the current coming through resistor R16 to charge capacitor C11 faster thereby to increase the frequency of the oscillator. This frequency increase is proportional to the supply voltage increase above the predetermined value and is discontinued when the supply voltage again decreases below 300 volts at which point Zener diode ZD2 restores to its blocking condition.

When switch SW is opened, relays UV and CR restore and relay UV recloses its contact 1. This completes a discharge path for capacitor C1 through resistor R3 and contact 1 to discharge this capacitor into readiness for time delay reoperation of relay CR when switch SW is reclosed or when power is interrupted and restored. Diode D1 blocks the discharge current of capacitor C1 from maintaining relay CR energized. Upon deenergization relay CR reopens contacts 1 and 2 to disconnect power from the inverter system and recloses contacts 3 and 4 to connect resistor R4 across the input of the inverter to discharge any charged capacitors therein to insure a condition of quiescence before restarting.

While the system hereinbefore described is effectively adapted to fulfill the objects stated, it is to be understood that the invention is not intended to be limited to the particular preferred embodiment of constant frequency inverter with frequency override disclosed, inasmuch as it is susceptible of various modifications without departing from the scope of the invention.

I claim:
1. An inverter system for converting direct current to alternating current comprising:
   a D.C. source having a nominal voltage value from which it might vary upwardly;
   a static inverter circuit;
   an output transformer connected to said static inverter circuit;
   means for connecting said D.C. source to said static inverter circuit to supply operating voltage thereto;
   said static inverter circuit comprising controllable static switching means for connecting said D.C. source to said output transformer with alternating direction of current flow to provide an A.C. output;
   and control means supplied from said D.C. source for controlling said static switching means comprising;
   a pulse generator for producing a series of electrical pulses;
   means supplied from said D.C. source for controlling said pulse generator to produce said pulses at a predetermined normal frequency and for maintaining such frequency constant with increase in D.C. source voltage up a predetermined value above nominal value;
   means responsive to said pulses for controlling said static switching means to provide an A.C. output of normal frequency at said transformer;
   and frequency override means responsive to increase in the voltage magnitude of the D.C. source above said predetermined value for increasing said pulse generator frequency above said normal frequency to prevent saturation of said output transformer.

2. The invention defined in claim 1, wherein said frequency override means comprises:
   means for rendering said pulse generator frequency proportional to the amount by which said D.C. source voltage exceeds said predetermined value.

3. The invention defined in claim 2, wherein said means for rendering said pulse generator frequency proportional comprises:
   spillover means responsive to said D.C. source voltage exceeding said predetermined value for passing a current;
   and amplifier means responsive to said current for increasing the pulse generator frequency in proportion thereto.

4. The invention defined in claim 3, wherein said spillover means comprises:
   a voltage divider supplied across said D.C. source;
   and a Zener diode connected to a tap on said voltage divider responsive to a breakover voltage for providing an input current to said amplifier means.

5. The invention defined in claim 1, wherein said means for connecting said D.C. source to said static inverter circuit comprises:
   a resistance shunt normally connected across the supply input terminals of said inverter circuit;
   and manually controllable time delay means for connecting said D.C. source to said input terminals and for disconnecting said resistance shunt therefrom to allow time for the inverter circuit to discharge before power can be reconnected thereto.

6. The invention defined in claim 1, wherein said static inverter circuit comprises:
   a solid state half-bridge including said static switching means connectable through supply conductors across said D.C. source by said connecting means and having a center point for connection to one side of said output transformer;
   a voltage divider connected across said supply conductors and having a center point providing an intermediate voltage point for connection to the other side of said output transformer;
   and feedback means comprising an auto transformer having its primary winding connected between the center point of said half-bridge and said one side of said output transformer and having its secondary winding connected by unidirectional diodes to said supply conductors.

7. An inverter system for converting direct current to alternating current comprising:
   a D.C. source having a nominal voltage value from which it might vary;
   a semiconductor inverter circuit;
   an output transformer connected to said inverter circuit and being of the regulating type which maintains the output voltage magnitude substantially constant with increase in supply voltage magnitude up to a predetermined value above nominal voltage;
   means for connecting said D.C. source to said inverter circuit to supply operating voltage thereto;
   said inverter circuit comprising controlled rectifier switching means for connecting said D.C. source to said output transformer with alternating direction of current flow to provide an A.C. output;
   and control means supplied from said D.C. source for firing said controlled rectifier switching means comprising:
   an oscillator for producing a series of electrical pulses;
   means supplied from said D.C. source for controlling said oscillator to produce said pulses at a predetermined normal frequency and for maintaining said frequency constant with increase in D.C. source voltage up to said predetermined value;

means responsive to said pulses for producing firing signals for said controlled rectifier switching means; and supplementary frequency control means responsive to said D.C. voltage for increasing said oscillator frequency above the normal rate at start-up and at any other time that said D.C. source voltage exceeds said predetermined value.

8. The invention defined in claim 7, wherein said oscillator comprises:
  a unijunction transistor relaxation oscillator having a frequency dependent on the amount of current flow thereto.

9. The invention defined in claim 8, wherein said supplementary frequency control means comprises:
  an RC timing circuit for supplying additional current to said oscillator for a short time interval at start-up;
  and voltage-responsive spillover circuit for supplying additional current to said oscillator if said D.C. source voltage exceeds said predetermined value.

10. The invention defined in claim 9, wherein said RC timing circuit comprises:
  a resistor and a capacitor connected in series directly between the emitter of said unijunction transistor oscillator and a D.C. supply.

References Cited

UNITED STATES PATENTS

| | | | |
|---|---|---|---|
| 3,248,637 | 4/1966 | Albert et al. | 321—18 |
| 3,264,548 | 8/1966 | King | 321—45 |
| 3,333,179 | 7/1967 | Freeman | 321—45 |
| 3,344,336 | 9/1967 | Moyer et al. | 321—48 |
| 3,350,625 | 10/1967 | Larsen | 321—45 |
| 3,355,653 | 11/1967 | Paradissis | 321—18 XR |
| 3,376,493 | 4/1968 | Carlson | 321—45 |
| 3,398,352 | 8/1968 | Jamieson | 321—45 |

LEE T. HIX, Primary Examiner

W. M. SHOOP, Jr., Assistant Examiner

U.S. Cl. X.R.

321—18, 45